(12) United States Patent
Rich et al.

(10) Patent No.: US 6,411,311 B1
(45) Date of Patent: Jun. 25, 2002

(54) USER INTERFACE FOR TRANSFERRING ITEMS BETWEEN DISPLAYED WINDOWS

(75) Inventors: Christopher Jacob Rich, Gilroy; John Kurt Muller, Morgan Hill, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,133

(22) Filed: Feb. 9, 1999

(51) Int. Cl.[7] .................................................. G06F 3/00
(52) U.S. Cl. ........................ 345/769; 345/804; 345/810
(58) Field of Search ................................. 345/340, 352, 345/341, 346, 347, 975, 339, 348, 145, 781, 784, 804, 808, 810, 764, 769

(56) References Cited

U.S. PATENT DOCUMENTS

| | | | | |
|---|---|---|---|---|
| 5,414,810 A | * | 5/1995 | Doyle et al. ................. | 345/346 |
| 5,630,080 A | * | 5/1997 | Malamud et al. ........... | 345/769 |
| 5,694,563 A | * | 12/1997 | Belfiore et al. ............. | 345/352 |
| 5,696,915 A | * | 12/1997 | Johnston, Jr. et al. ...... | 345/335 |
| 5,724,595 A | | 3/1998 | Gentner ....................... | 707/501 |
| 5,761,683 A | | 6/1998 | Logan et al. ................ | 707/513 |
| 6,195,079 B1 | * | 2/2001 | Reddy ......................... | 345/121 |

OTHER PUBLICATIONS

Manning & Napier Information Services, vol. 16, Jan. 1, 1998, Mike Finn, "Databased Web Advisor".

* cited by examiner

Primary Examiner—Raymond J. Bayerl
Assistant Examiner—Kieu D. Vu
(74) Attorney, Agent, or Firm—Ohlandt, Greeley, Ruggiero & Perle, L.L.P.; Ingrid M. Foerster, Esq.

(57) ABSTRACT

A computer implemented method is described for enabling a user to transfer, via a graphical user interface, an item from one displayed window to another displayed window. Initially, a first window is displayed with an item to be moved and a second window is displayed with one or more destinations to which the item can be moved. Thereafter, the user selects the item to be moved, causing a further window to be displayed which includes one or more commands, one of which manifests a movement action. Upon selection of the movement command, the graphical interface displays a list of destinations with which the item to be moved can be associated by actuating the movement command. Thereafter, responding to a selection of one of the displayed destinations, the computer which operates the graphical view user interface associates the item being moved with the selected destination and alters the display so that at least one of the displayed windows manifests the movement action.

14 Claims, 5 Drawing Sheets

USER INTERFACE FOR TRANSFERRING ITEMS BETWEEN DISPLAYED WINDOWS

FIELD OF THE INVENTION

This invention relates to a graphical user interface which enables transfers of items between displayed windows in a single application, and between windows of differing applications. More particularly, the invention relates to a user interface for the Java language which enables item transfers in an environment where "drag and drop" actions are not supported.

BACKGROUND OF THE INVENTION

A "drag and drop" function is supported by many applications and enables data transfers across applications, between differing applications and within a single application. For example, the Windows™ operating system (Windows is a trademark of Microsoft, Inc.) supports drag and drop actions as do other operating systems. A drag and drop interface enable a user to move, transfer and even convert objects by simply selecting them with a mouse and dragging their icon representations from one part of a screen to another. Dragging an object from one window to another window is typically interpreted by the control software as a request to move the object. Dragging an object's icon and dropping it onto another icon is interpreted by the control system as a request to join the two objects in some way, perhaps by supplying the dropped object as an input parameter to the target object, which may represent a program.

The prior art, utilizing Windows-like applications employ drag and drop actions to create communication links by dragging an icon from one target hypertext document to a specified location in another hypertext document (see U.S. Pat. No. 5,724,595 to Gentner). Other programs such as the SuperCede Database Edition 1.2, a database-oriented programming tool, provides a graphical user interface which enables two-way editing. Essentially, the Supercede program is a tool for use with the Java language in the development of various business applications. However, the Java language does not, itself, currently support drag and drop operations.

While the Java "tool kit" application programmer interface does not provide a built-in facility for building drag and drop interfaces, there is still a requirement for such functionality. Further, there still remains a class of users who find it difficult to work with a mouse and prefer to operate arrow keys on a computer keyboard to select items on a display screen.

Accordingly, it is an object of this invention to provide a graphical user interface which enables movement of items between displayed windows.

It is a further object of this invention to provide a method for moving items between windows which can respond to either mouse inputs or manipulated arrow keys by moving a cursor and enabling a displayed item's selection.

SUMMARY OF THE INVENTION

A computer implemented method is described for enabling a user to transfer, via a graphical user interface, an item from one displayed window to another displayed window. Initially, a first window is displayed with an item to be moved and a second window is displayed with one or more destinations to which the item can be moved. Thereafter, the user selects the item to be moved, causing a further window to be displayed which includes one or more commands, one of which manifests a movement action. Upon selection of the movement command, the graphical interface displays a list of destinations with which the item to be moved can be associated by actuating the movement command. Thereafter, responding to a selection of one of the displayed destinations, the computer which operates the graphical view user interface associates the item being moved with the selected destination and alters the display so that at least one of the displayed windows manifests the movement action.

DETAILED DESCRIPTION OF THE INVENTION

Figure 1:
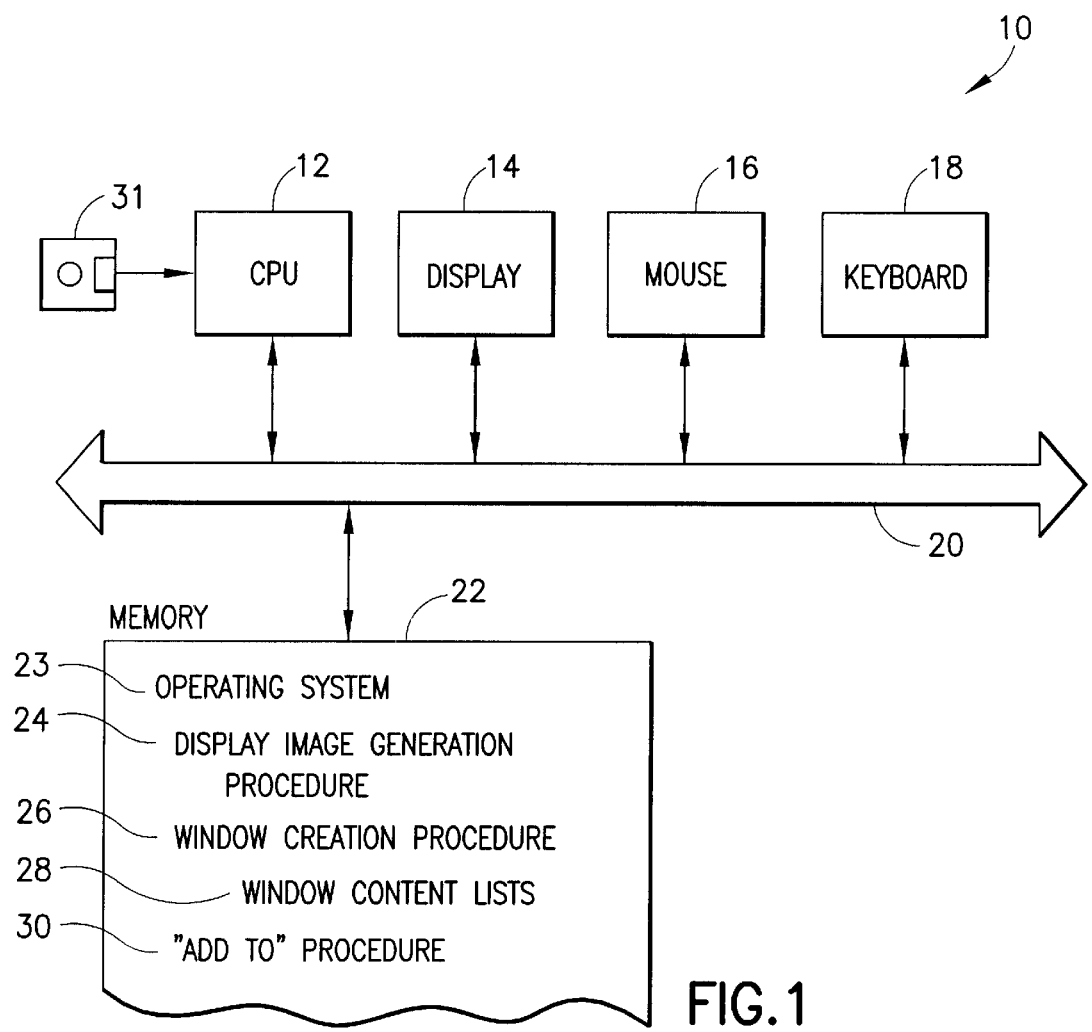
FIG. 1 is a block diagram of a computer system adapted to perform the invention.

Referring to FIG. 1, a computer 10 incorporates a central processing unit (CPU 12), a display 14, a mouse input 16 and a keyboard input 18, all of which are coupled by a bus system 20. A memory 22 includes various software procedures for operating computer 10 and among those is operating system 23, a display image generation procedure 24, a window creation procedure 26 and window contents lists 28. Further, an "add to" procedure 30 is stored in memory 22 and enables transfer of an item from a source window to a destination window, and more particularly, to an object within the destination window.

Display image generation procedure 24 constructs window images in accordance with the results of an application being executed by CPU 12, under control of operating system 23. Within image generation procedure 24 is a window creation procedure 26 which creates the necessary code to cause display 14 to manifest windows with included data items such as folders, documents, tool bars, etc., etc. Further, as each window is created by procedure 26, a window contents list 28 is created with necessary pointers to the actual data underlying the listed item.

"Add to" procedure 30 enables a selected item from a list in one window to be associated with a listed destination item in another window, but does not employ a drag and drop procedure of the prior art. More particularly, instantiation of the add-to procedure causes an additional window/menu/button to be displayed with a listing of the possible destinations for the item to be moved. Upon selection of a listed destination, the item to be moved is associated with the selected destination (e.g. via a pointer or other associating data construct). In addition, display 14 alters its image by moving the item to be moved to the window containing the destination and displays the item in its new locale.

Figure 2:
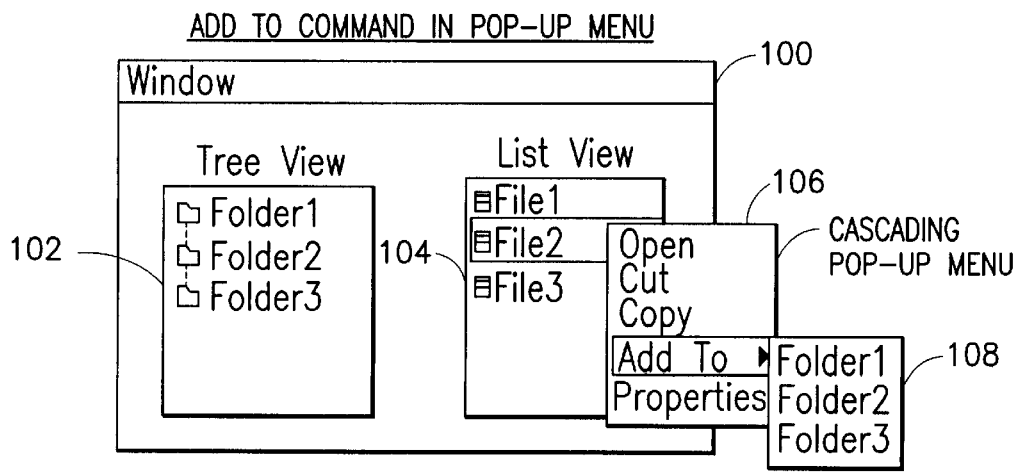
FIG. 2 illustrates a sequence of windows which are created as a result of the implementation of the invention, using a first embodiment.

This action is illustrated in FIG. 2, where a window 100 includes two interior windows 102 and 104. Window 102 comprises a tree view of a plurality of folders and window 104 is a list view of three files. Assuming that it is desired to move file 2 to one of the folders in tree view window 102, the user, either by manipulation of a mouse or through use of up/down arrow keys, the tab key or an accelerator key to select file 2. That selection, in turn, causes a pop-up menu window 106 to appear. Window 106 provides plural options available to the user with respect to selected file 2. One of those options is an "add to" command that enables the movement of file 2 elsewhere within window 100 and, more particularly, to a location within tree view window 102.

Upon selecting the "add to" command, a cascading pop-up menu 108 appears which lists the possible destinations to which file 2 can be transferred. Thereafter, the user selects one of the illustrated folders and file 2 is thereafter associated with the selected folder and, its image is moved to tree view window 102 beneath the selected folder.

Figure 3:
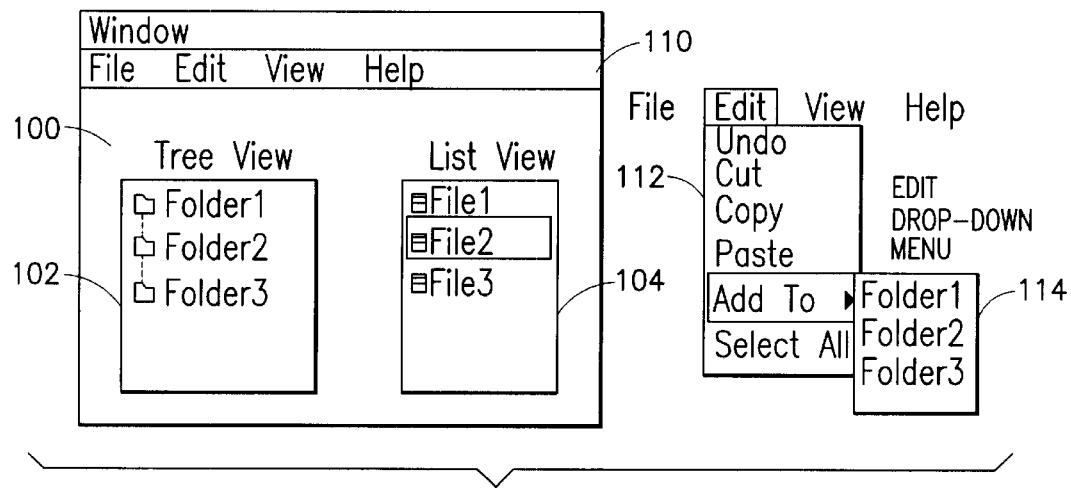
FIG. 3 illustrates a sequence of windows which are created as a result of the implementation of the invention, using a second embodiment.

FIG. 3 provides a second embodiment of the invention wherein the list of optional commands with respect to a selected item in a window is displayed in response to a user selection of an item in menu bar 110. In this instance, a user selection of the "Edit" entry on tool bar 110 (after having selected file 2 in list view window 104) causes a drop down menu 112 to appear. Thereafter, the user uses the same procedure, as aforedescribed, to select the "add to" command which, in turn, causes a cascading menu 114 to appear which lists the possible destinations for selected file 2. Upon selecting one of folders 1–3, the file 2 item from window 104 appears in window 102 under the selected folder and appropriate pointers are associated with file 2 to link it to the selected folder.

Figure 4:
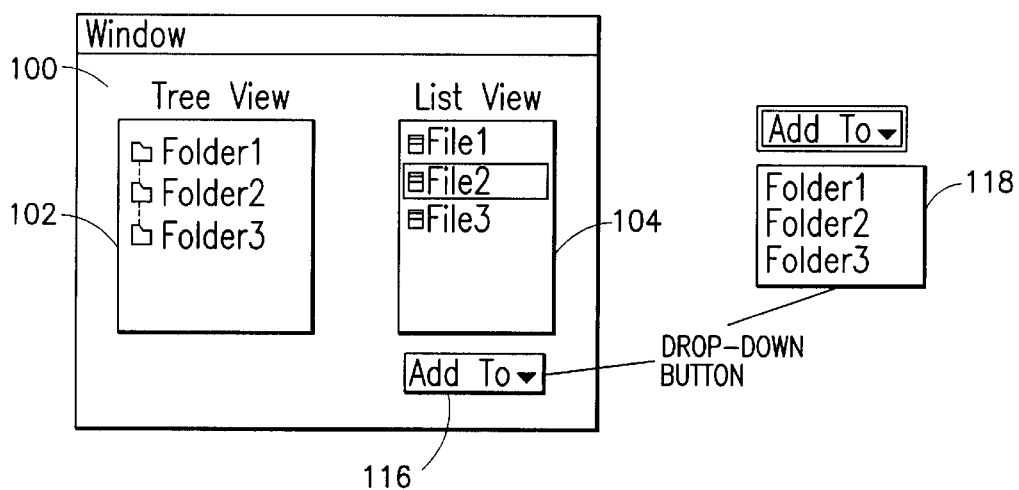
FIG. 4 illustrates a sequence of windows which are created as a result of the implementation of the invention, using a third embodiment.

Turning to FIG. 4, a third embodiment of the invention utilizes a drop down button 116 to illustrate the various commands that are available when one of the files is selected in window 104. The available commands can be sequenced through drop down button 116 by actuation of either up or down arrow keys. One such command is the add-to command which, upon selection, causes display of drop down menu 118. Thereafter, the procedure followed to transfer file 2 to a selected folder in tree view window 2 is the same as described above.

Figure 5:
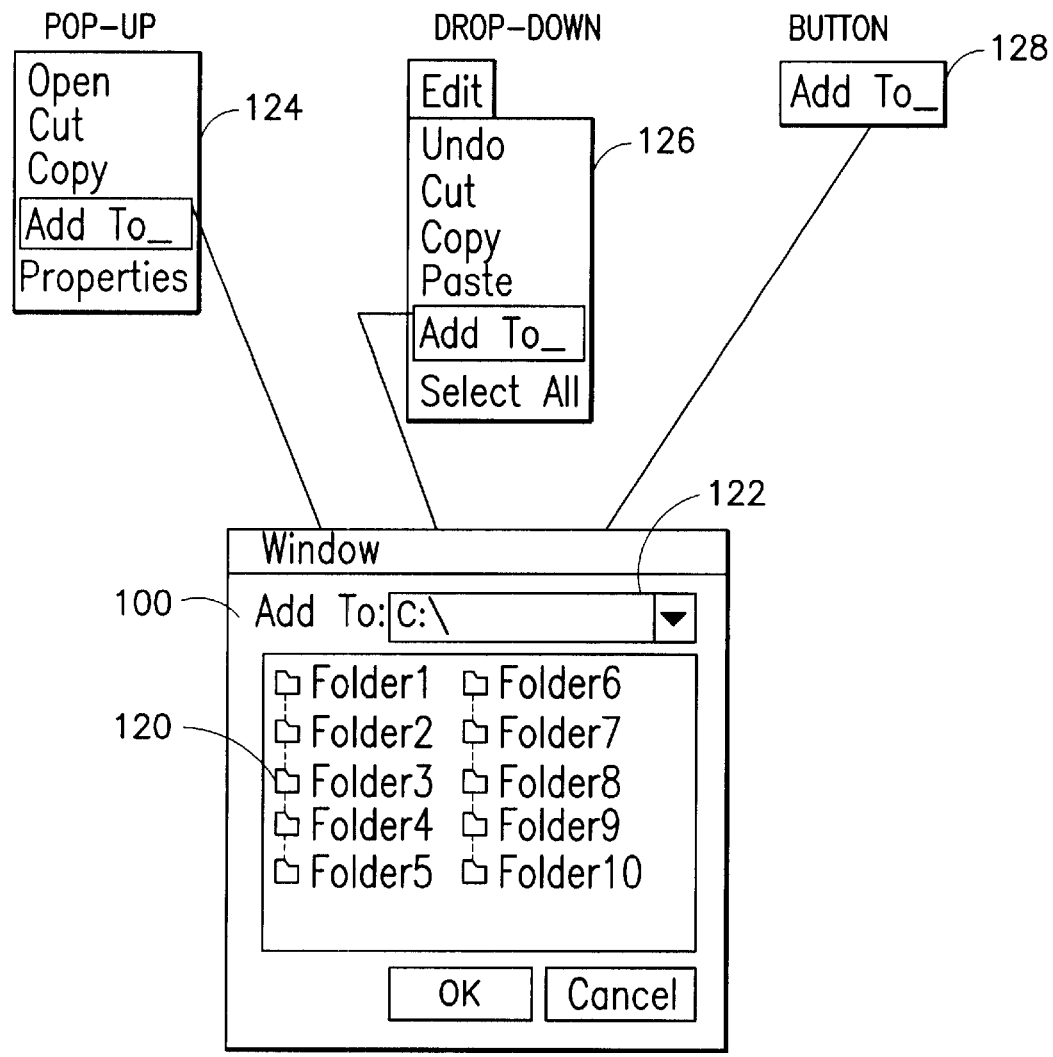
FIG. 5 illustrates a sequence of windows which are created as a result of the implementation of the invention, using a fourth embodiment.

Referring now to FIG. 5, it may be the case that there are many listed possible destinations for an item, which destinations leave little room on the display to list additional destinations. In such case, lieu of displaying a window with all possible destinations, a further window is displayed which enables the user to type in a destination. More particularly, in the case shown in FIG. 5, window 100 includes a window 120 that is a tree view illustrating ten folders that comprise possible destinations for an item. A further window 122 enables entry of the name of another destination to which a particular item is to be moved.

To cause the "Add to" window 100 to appear, either a pop-up menu 124, a drop down menu 126 or a button 128 can be used to institute the add-to procedure. In this case, the selection of the add-to command causes window 100 to be launched, enabling the user to enter the name of a destination.

Figure 6:
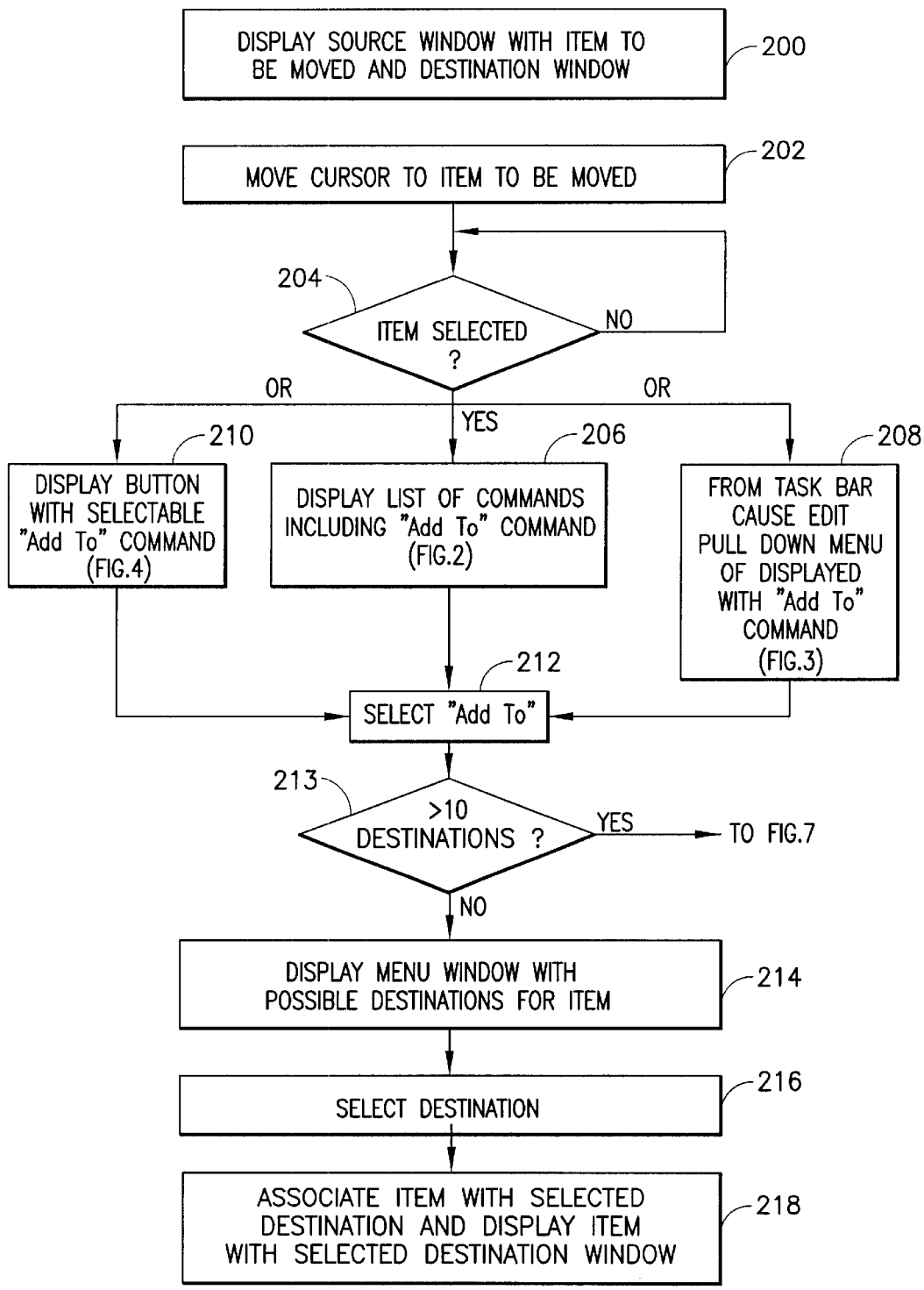
FIG. 6 is a logical flow diagram that illustrates three methods for implementing the invention, as illustrated in FIGS. 2–4.

Turning now to FIG. 6, a flow diagram is shown illustrating procedures employed by the embodiments of FIGS. 2–4. Initially, a source window with an item to be moved is displayed, as is a destination window (step 200). Thereafter, the user moves a cursor to the item to be moved (step 202) and assuming the item is selected (step 204), the procedure moves to one of steps 206, 208 or 210, depending upon which embodiment of the invention has been implemented. In any of the illustrated cases, an "add to" command is displayed and, upon its selection (step 212), causes a menu window to be displayed with possible destinations for the item to be moved (step 214). If there are more than 10 possible destinations, for example, the procedure moves to step 220 in FIG. 7 (to be described below).

After a destination is selected (step 216), the selected item is associated with the selected destination and the window with the selected destination is altered to indicate the presence of the selected item (step 218).

Figure 7:
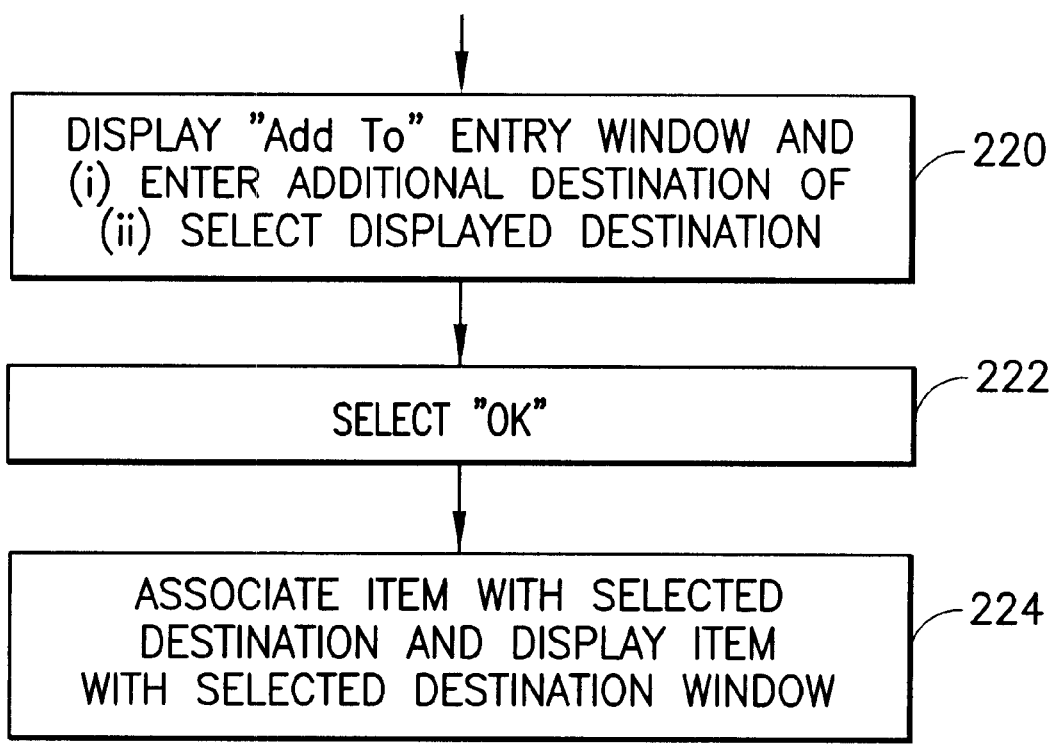
FIG. 7 i s a logical flow diagram that illustrates a fourth method for implementting the invention, as illustrated in FIG. 5.

FIG. 7 illustrates the procedure of the invention when the embodiment of FIG. 5 is employed. If step 213 determines that there are greater than 10 possible destinations, an "add to" entry window is displayed (step 220). Thereafter, the user enters the desired destination into the entry window or selects one of the possible destinations that are already displayed. Upon then selecting "OK" (step 222), the item is associated with the selected destination and the item is then displayed with the selected destination in the destination window (step 224).

While the above description has assumed that all of the procedures required to implement the invention are already loaded into memory 22 (FIG. 1), such procedures may be stored on a memory media such as one or more magnetic diskettes 31, compact disks or other data storage media.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A computer implemented method for enabling a user to transfer an item via a graphical interface on a display, said method comprising the steps of:

a) detecting a user selection of said item to be moved from a first displayed window to a destination in a second displayed window, and causing a third window to be displayed including a command enabling an item movement action;

b) responding to a selection by said user of said command by displaying a list that includes said destination, wherein said list is derived from said second displayed window; and c) responding to a selection by said user of said destination by executing said command to cause an association of said item with said destination, and to indicate said association in said second window.

2. The method as recited in claim 1, wherein step a) displays said third window by instantiating a menu window on said display.

3. The method as recited in claim 2, wherein step b) displays said list by displaying a fourth window including said list.

4. The method as recited in claim 1, wherein step a) displays said third window by instantiating a menu window on said display in response to a user's selection of a task listed on a displayed task bar.

5. The method as recited in claim 4, wherein step b) displays said list by displaying a further menu window including said list.

6. The method as recited in claim 1, wherein step a) displays said third window by instantiating a display button with menu items that are rotatable therethrough.

7. A computer implemented method for enabling a user to transfer, via a graphical interface, an item from one displayed window to a destination in another displayed window, said method comprising the steps of:
   a) detecting a user selection of said item to be moved, said selecting causing a further window to be displayed including one or more commands, at least one said command enabling an item movement action;
   b) responding to a detected selection by said user of said one said command by displaying a list of destinations with which said item that was selected can be associated by execution of said one said command; and
   c) responding to a detected selection by said user of a destination by executing said one said command to cause association of said item to be moved with said destination that has been selected and to display said item to be moved in juxtaposition to said destination that has been selected,
   wherein step b) includes the substeps of:
   detecting that a number of possible destinations exceeds a threshold value of destinations to be displayed, and displaying an entry window into which a destination name can be entered; and
   detecting selection of a destination name in said entry window or of another displayed destination.

8. A memory media for controlling a computer to enable a user to transfer an item via a graphical interface on a display, said memory media comprising:
   a) means for controlling said computer to detect a user selection of said item to be moved from a first displayed window to a destination in a second displayed window, and to cause a third window to be displayed including a command enabling an item movement action;
   b) means for controlling said computer to respond to a selection by said user of said command by displaying a list that includes said destination, wherein said list is derived from said second displayed window; and
   c) means for controlling said computer to respond to a selection by said user of said destination by executing said command to cause an association of said item with said destination, and to indicate said association in said second displayed window.

9. The memory media as recited in claim 8, wherein means a) controls said computer to display said third window by instantiating a menu window on said display.

10. The memory media as recited in claim 9, wherein means b) controls said computer to display said list by displaying a fourth window including said list.

11. The memory media as recited in claim 8, wherein means a) controls said computer to display said third window by instantiating a menu window on said display in response to a user's selection of a task listed on a displayed task bar.

12. The memory media as recited in claim 11, wherein means b) controls said computer to display said list by displaying a further menu window including said list.

13. The memory media as recited in claim 8, wherein means a) controls said computer to display said third window by instantiating a display button with menu items that are rotatable therethrough.

14. A memory media for controlling a computer to enable a user to transfer, via a graphical interface, an item from one displayed window to a destination in another displayed window, said memory media comprising:
   a) means for controlling said computer to detect a user selection of said item to be moved, and in response, to cause a further window to be displayed including one or more commands, at least one said command enabling an item movement action;
   b) means for controlling said computer to respond to a detected selection by said user of said one said command by displaying a list of destinations with which said item that was selected can be associated by execution of said one said command; and
   c) means for controlling said computer to respond to a detected selection by said user of a destination by executing said one said command to cause association of said item to be moved with said destination that has been selected and by displaying said item to be moved in juxtaposition to said destination that has been selected,
   wherein means b), upon detecting that a number of possible destinations exceeds a threshold value of destinations to be displayed, causes said computer to display an entry window into which a destination name can be entered; and subsequently detects selection of a destination entry in said entry window or of another displayed destination.

* * * * *